United States Patent
Uhlhorn et al.

(10) Patent No.: US 7,903,973 B1
(45) Date of Patent: Mar. 8, 2011

(54) DYNAMIC TEMPORAL DURATION OPTICAL TRANSMISSION PRIVACY

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1324 days.

(21) Appl. No.: 11/317,135

(22) Filed: Dec. 23, 2005

(51) Int. Cl.
*H04J 4/00* (2006.01)

(52) U.S. Cl. .............. 398/77; 398/78; 398/75; 398/76; 398/99

(58) Field of Classification Search ................ 398/77, 398/78, 72, 99, 75, 76, 98
See application file for complete search history.

(56) References Cited

U.S. PATENT DOCUMENTS

| | | | |
|---|---|---|---|
| 4,506,387 A | 3/1985 | Walter | |
| 4,723,310 A | 2/1988 | De Corlieu et al. | |
| 4,779,266 A * | 10/1988 | Chung et al. | 370/441 |
| 5,327,276 A | 7/1994 | Shimosaka et al. | |
| 5,404,240 A | 4/1995 | Nishio et al. | |
| 5,424,543 A | 6/1995 | Dombrowski et al. | |
| 5,450,224 A | 9/1995 | Johansson | |
| 5,594,577 A | 1/1997 | Majima et al. | |
| 5,686,722 A | 11/1997 | Dubois et al. | |
| 5,793,907 A | 8/1998 | Jalali et al. | |
| 5,838,437 A | 11/1998 | Miller et al. | |
| 6,014,237 A | 1/2000 | Abeles et al. | |
| 6,025,944 A | 2/2000 | Mendez et al. | |
| 6,038,357 A | 3/2000 | Pan | |
| 6,292,282 B1 * | 9/2001 | Mossberg et al. | 398/99 |
| 6,388,782 B1 | 5/2002 | Stephens et al. | |
| 6,486,984 B1 | 11/2002 | Baney et al. | |
| 6,594,050 B2 | 7/2003 | Jannson et al. | |
| 6,614,950 B2 | 9/2003 | Huang et al. | |
| 6,690,853 B1 | 2/2004 | Alaimo et al. | |
| 6,728,445 B2 | 4/2004 | Blomquist et al. | |
| 6,748,083 B2 | 6/2004 | Hughes et al. | |
| 6,778,102 B1 | 8/2004 | Grunnet-Jepsen et al. | |
| 6,904,239 B2 | 6/2005 | Chow et al. | |
| 6,915,077 B2 | 7/2005 | Lo | |
| 6,959,032 B1 * | 10/2005 | Richards et al. | 375/138 |

(Continued)

OTHER PUBLICATIONS

Design of Multilength Optical Orthogonal Codes for Optical CDMA Multimedia Networks Wing C. Kwong, Senior Member, IEEE, and Guu-Chang Yang, Member, IEEE @Aug. 2002.*

*Primary Examiner* — Ken N Vanderpuye
*Assistant Examiner* — Hibret A Woldekidan
(74) *Attorney, Agent, or Firm* — Marsh Fischmann & Breyfogle LLP

(57) ABSTRACT

Systems and methods are presented herein to achieve data privacy in the optical realm such that electronic encryption bottlenecks are removed, potentially increasing data transmission speeds to the limit of fiber optic media. In this regard, privatizing an optical data transmission may include dynamically altering a temporal length of data bits in an optical data transmission or dynamically altering a temporal length of data frames in an optical data transmission. For example, in a two-dimensional OCDMA signal, the temporal length of data bits may be altered by changing the number of time chips on a per bit basis (e.g., using OCDMA signatures having different temporal lengths). In an optical data bit scrambling signal, the temporal length of data frames may be altered by changing the number of time slices on a per data frame basis.

26 Claims, 8 Drawing Sheets

U.S. PATENT DOCUMENTS

| | | |
|---|---|---|
| 7,023,830 B1 * | 4/2006 | Agin .................... 370/342 |
| 7,035,544 B1 | 4/2006 | Won |
| 7,063,260 B2 | 6/2006 | Mossberg et al. |
| 7,110,671 B1 | 9/2006 | Islam |
| 7,113,703 B2 | 9/2006 | Murata |
| 7,174,103 B2 * | 2/2007 | Nishiki et al. ............ 398/77 |
| 7,200,331 B2 | 4/2007 | Roorda et al. |
| 7,200,342 B2 | 4/2007 | Dafesh |
| 7,239,772 B2 | 7/2007 | Wang et al. |
| 7,260,655 B1 | 8/2007 | Islam |
| 7,305,035 B2 * | 12/2007 | Kondo et al. .......... 375/240.23 |
| 7,308,197 B1 | 12/2007 | Zhong et al. |
| 7,317,698 B2 | 1/2008 | Jagger et al. |
| 7,324,753 B2 | 1/2008 | Kashima et al. |
| 7,330,660 B2 | 2/2008 | Duelk |
| 7,340,187 B2 | 3/2008 | Takeshita |
| 7,341,189 B2 | 3/2008 | Mossberg et al. |
| 7,349,460 B2 * | 3/2008 | Choi et al. ................ 375/146 |
| 7,366,426 B2 | 4/2008 | Kai et al. |
| 7,369,765 B2 | 5/2008 | Aoki et al. |
| 7,406,262 B2 | 7/2008 | Nakagawa et al. |
| 7,415,212 B2 | 8/2008 | Matsushita et al. |
| 7,418,209 B2 | 8/2008 | Salamon et al. |
| 7,418,212 B1 | 8/2008 | Bontu |
| 7,433,600 B2 | 10/2008 | Katagiri et al. |
| 7,437,080 B2 | 10/2008 | Schmidt et al. |
| 7,450,239 B2 | 11/2008 | Uehara et al. |
| 7,474,854 B2 | 1/2009 | Sekiya et al. |
| 7,499,652 B2 | 3/2009 | Zhong et al. |
| 7,505,687 B2 | 3/2009 | Jaggi et al. |
| 2002/0030868 A1 | 3/2002 | Salomaa |
| 2002/0067523 A1 | 6/2002 | Way |
| 2002/0067883 A1 | 6/2002 | Lo |
| 2002/0150334 A1 * | 10/2002 | Richardson et al. ........... 385/37 |
| 2002/0196541 A1 | 12/2002 | Cai |
| 2003/0123789 A1 | 7/2003 | Miyata et al. |
| 2003/0152393 A1 | 8/2003 | Khoury |
| 2003/0223687 A1 | 12/2003 | Blomquist et al. |
| 2004/0141499 A1 | 7/2004 | Kashima et al. |
| 2004/0184809 A1 | 9/2004 | Miyata et al. |
| 2004/0197099 A1 | 10/2004 | Kai et al. |
| 2004/0223763 A1 * | 11/2004 | Lee et al. .................. 398/78 |
| 2004/0248515 A1 * | 12/2004 | Molev Shteiman ......... 455/63.1 |
| 2005/0019034 A1 | 1/2005 | Aoki et al. |
| 2005/0084266 A1 * | 4/2005 | Pohjola et al. ................ 398/77 |
| 2005/0111376 A1 | 5/2005 | Raghothaman et al. |
| 2005/0147414 A1 | 7/2005 | Morrow et al. |
| 2005/0219543 A1 | 10/2005 | Uehara et al. |
| 2005/0281558 A1 | 12/2005 | Wang et al. |
| 2006/0098983 A1 | 5/2006 | Han et al. |
| 2006/0115210 A1 | 6/2006 | Nakagawa |
| 2006/0171719 A1 | 8/2006 | Schmidt et al. |
| 2006/0209739 A1 * | 9/2006 | Kumar et al. ............... 370/320 |
| 2006/0209934 A1 * | 9/2006 | Zhengdi et al. .............. 375/150 |
| 2006/0210083 A1 | 9/2006 | Takemoto et al. |
| 2006/0257143 A1 | 11/2006 | Cavazzoni et al. |
| 2007/0036553 A1 | 2/2007 | Etemad et al. |
| 2007/0110442 A1 | 5/2007 | Peer |
| 2008/0002974 A1 | 1/2008 | Zhong et al. |
| 2009/0016726 A1 | 1/2009 | Suzuki et al. |

* cited by examiner

DYNAMIC TEMPORAL DURATION OPTICAL TRANSMISSION PRIVACY

FIELD OF THE INVENTION

The present invention generally relates to the privacy of an optical data transmission and, more particularly, to enhancing the privacy of the optical data transmission by dynamically altering the temporal length of an Optical Code Division Multiple Access signature or an optical data frame used to transmit data.

BACKGROUND OF THE INVENTION

Optical communications are typically implemented by transmitting data through fiber-optic links because light is less prone to optical dispersion through fiber-optic links as opposed to other mediums, such as air. These optical communications use light to convey data to an intended receiver through the fiber-optic link, through "on-off keying" of the wavelength. For example, a binary signal (i.e., a signal of logical 1's and logical 0's) is transmitted through a fiber-optic link with the light switching on and off.

Demand on communications has dictated that optical fiber be shared among users. One method of sharing involves assigning specific time periods to individual users and is called Time Division Multiplexing ("TDM"). During a period of time in TDM, a single user transmits data and other users wait for their time period. Another method of sharing involves assigning specific wavelengths of light to individual users and is called Wavelength Division Multiplexing ("WDM"). In WDM, each user has a specific wavelength of light and may transmit data on that wavelength at any time, but no other user may use that wavelength. Optical Code Division Multiple Access ("OCDMA") is yet another method to share the optical fiber among a number of users. In OCDMA, each user is assigned a unique code that is composed of temporal and wavelength components. This unique OCDMA signature may be thought of as a unique identifier or thumbprint on a data stream. For a user to receive a data stream, the user must detect a data stream having an appropriate OCDMA signature.

As with other forms of communications, such as radio frequency communications, it is often preferable to encrypt data being transmitted to maintain data privacy. In optical communications, data is typically encrypted in the electronic realm prior to optical transmission in order to achieve data privacy. Once encrypted, the data may be optically transmitted using one of the methods discussed hereinabove. Encryption in the electronic realm, however, often introduces a bottleneck (i.e., a communication slowdown) to the transmission of data because, among other reasons, electronic switching speeds are simply slower than optical transmission speeds.

BRIEF SUMMARY OF THE INVENTION

Typically, data transmission speed through fiber optic media is significantly faster than the processing speed of acceptable encryption electronics. By achieving data privacy in the optical realm, electronic encryption bottlenecks may be removed, potentially increasing data transmission speeds to the limit of fiber optic media. In this regard, the invention is generally directed to privatizing an optical data transmission by dynamically altering a temporal length of data bits or data frames in the optical data transmission. For example, a number of time chips in a two-dimensional OCDMA signal may be successively varied according to a predetermined sequence whereas, in optical data bit scrambling, successive data frames are dynamically varied by changing the number of time slices. These and other aspects of the invention may advantageously provide for secure data transmissions with relatively fast data transmission speeds.

A first aspect of the invention generally relates to privatizing an optical data transmission through using a plurality of OCDMA signatures, at least two of which have different temporal lengths. What may be characterized as a "series" is repeated a plurality of times to define the optical data transmission. In each series, an OCDMA signature is selected, a single data bit is converted into an optical signal based upon this OCDMA signature, and this optical signal is thereafter transmitted. The selected OCDMA signature in at least one series has a different temporal length than the selected OCDMA signature from at least one other series.

Various refinements exist of the features noted in relation to the first aspect of the present invention. Further features may also be incorporated in the first aspect of the present invention as well. These refinements and additional features may exist individually or in any combination. A plurality of OCDMA signatures may be available for the OCDMA signature selection that is made in relation to each series. In one embodiment, the OCDMA signature that is used in one series is of a different temporal length than the OCDMA signature that is used by each adjacent series. Stated another way, the OCDMA signature that is used in relation to any particular bit has a different temporal length than the OCDMA signature that is used in relation to the immediately preceding-in-time bit. However, the OCDMA signatures may be selected in any appropriate manner so long as the optical data transmission has at least two OCDMA signatures having different temporal lengths (e.g., a first OCDMA signature having a first temporal length could be used for two adjacent bits, and then a second OCDMA signature have a different, second temporal length could be used for the next two bits).

In the case of the first aspect, the optical signal may be configured with a plurality of optical wavelengths. For example, the optical data transmission may be a two-dimensional OCDMA signal.

A second aspect of the invention is generally directed to a method of privatizing an optical data transmission, as well as a system that incorporates this functionality. The method includes a step of generating both a scramble pattern and a frame temporal length for a data frame. The method also includes the steps of assigning at least one data bit to at least one element within the data frame based upon the scramble pattern and transmitting the data frame after the assigning step. The method then repeats the steps of generating, assigning, and transmitting a plurality of times, with at least one execution of the generating step using a different scramble pattern and a different frame temporal length than another execution of the generating step.

Various refinements exist of the features noted in relation to the second aspect of the present invention. Further features may also be incorporated in the second aspect of the present invention as well. These refinements and additional features may exist individually or in any combination. The method may further include a step of configuring the optical signal with a plurality of optical wavelengths. For example, the optical data transmission may be an optical data bit scrambling signal having a plurality of optical wavelengths. The step of generating both a scramble pattern and a frame temporal length for a data frame may include the step of establishing a substantially constant time slice duration for each data frame. The step of assigning at least one data bit to at least one element within the data frame based upon the scramble pattern may include the step of electronically retrieving the single data bit from storage.

A third aspect of the invention is generally directed to privatizing an optical data transmission having what may be characterized as a plurality of optical data segments. What may be characterized as a "series" is repeated a plurality of times to define the optical data transmission. In each series, a temporal length of an optical data segment is established, data is thereafter embedded in this optical data segment, and thereafter this optical data segment is transmitted. The temporal length of at least two of the optical data segments in the optical data transmission are of different magnitudes in the case of the third aspect.

Various refinements exist of the features noted in relation to the third aspect of the present invention. Further features may also be incorporated in the third aspect of the present invention as well. These refinements and additional features may exist individually or in any combination. In one embodiment, each optical data segment in the optical data transmission has a different temporal length than each adjacent optical data segment in the optical data transmission. Stated another way, the temporal length of the optical data segment is changed on each execution of the noted series. Stated yet another way, the temporal length of the optical data segment that is used in the execution of one particular series is different than the temporal length of the optical data segment that was used in the execution of the immediately previous-in-time series. However, any appropriate pattern may be used for establishing the temporal length of each optical data segment in the optical data transmission, so long as at least two optical data segments in the optical data transmission have different temporal lengths.

A single data bit may be embedded in each optical data segment of the optical data transmission in the case of the third aspect. Multiple data bits may also be embedded in each optical data segment of the optical data transmission. One or more optical data segments in the optical data transmission could include a single data bit, while one or more optical data segments in the optical data transmission could include multiple data bits. It also may be such that a common number of data bits are embedded in each optical data segment of the optical data transmission.

Each optical data segment in the case of the third aspect may be characterized as including a plurality of time chips, where each time chip includes a plurality of wavelength slots, and where each time chip is of a common temporal length. The number of time chips in the optical data segments may be established in any appropriate manner such that at least two optical data segments in the optical data transmission use a different number of time chips. For instance, the number of time chips used by a particular optical data segment may be different than the number of time chips used by an immediately previous-in-time to optical data segment in the optical data transmission.

Each optical data segment in the case of the third aspect may also be characterized as including a plurality of elements in a two-dimensional array of time versus wavelength, where each element is of the same temporal length. The manner in which data is disbursed in each optical data segment may be controlled in any appropriate manner. For instance, each optical data segment in the optical data transmission may use a different dispersion pattern for data contained therein than the immediately previous-in-time optical data segment in the optical data is transmission. In one embodiment, both the number of elements and the dispersion pattern are changed for each adjacent optical data segment in the optical data transmission.

The third aspect may be implemented in any appropriate manner. For instance, different OCDMA signatures having different temporal lengths may be used. In this regard, the various features discussed above in relation to the first aspect may be used by this third aspect as well. The manner in which the temporal length of each optical data segment of the optical data transmission may be controlled in any appropriate manner (e.g., using an appropriate algorithm), the manner in which data is embedded in each optical data segment of the optical data transmission may be controlled in any appropriate manner (e.g., using an appropriate algorithm), or both. For instance, the various features discussed above in relation to the second aspect may be used by this third aspect as well.

Although the aspects of the invention generally provide for methods of privatizing optical data transmissions, those skilled in art should readily recognize that the invention is not limited to such methods. Rather, these aspects may be implemented with an optical communication system. For example, an electrical to optical converter may be configured to perform various steps described herein, such as changing a temporal length of optical data and transmitting the optical data.

BRIEF DESCRIPTION OF THE INVENTION AND THE SEVERAL VIEWS OF THE DRAWINGS

DETAILED DESCRIPTION OF THE INVENTION

Figure 1:
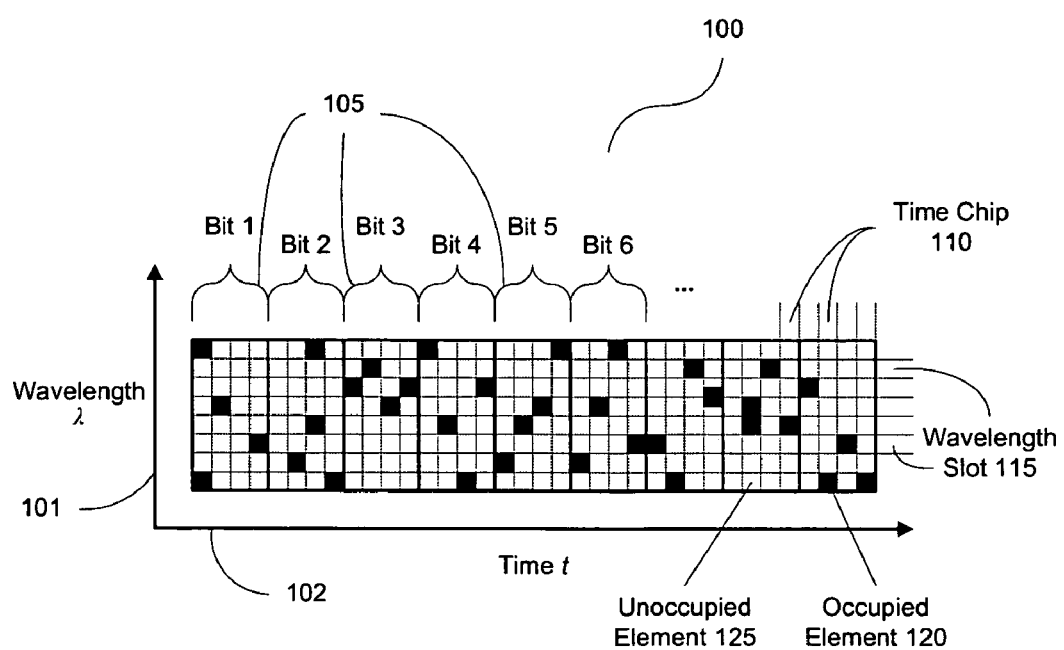
FIG. 1 is a signaling diagram illustrating wavelength versus time for a prior art two-dimensional OCDMA signal.
Figure 2:
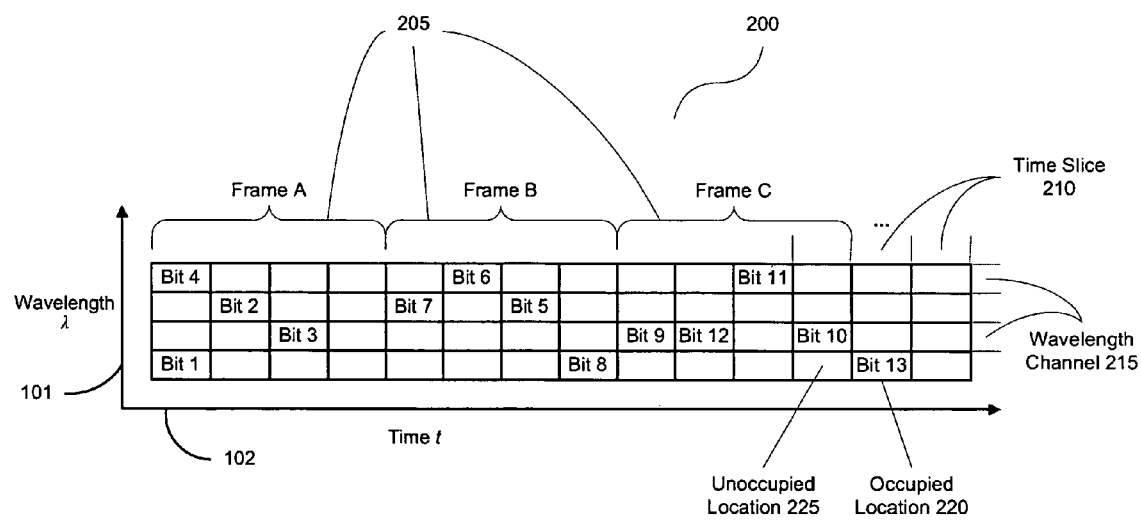
FIG. 2 is a signaling diagram illustrating wavelength versus time for a prior art optical data bit scrambling signal.

FIGS. 1 and 2 illustrate prior art optical signals comprising a plurality of wavelengths (i.e., illustrated along axis 101) versus time (i.e., illustrated along axis 102). FIG. 1 illustrates a prior art two-dimensional OCDMA signal 100, while FIG. 2 illustrates a prior art optical data bit scrambling signal 200.

In two-dimensional OCDMA signal 100, each data bit 105 is represented by an OCDMA signature. The data bit is divided into a number of time chips 110 and spread across a number of wavelength slots 115. Certain elements of this two-dimensional array are occupied (e.g., labeled 120) and represent a unique OCDMA signature for a single data bit in the data stream. An element is deemed occupied when a pulse of light is transmitted at a wavelength and duration that corresponds to the element. If all of the array elements for a particular OCDMA signature are occupied, a logical "1" is interpreted. If the number of array elements occupied is less than a certain threshold for a particular OCDMA signature, a logical "0" is interpreted.

The elements that are not needed for the particular OCDMA signature remain unoccupied (e.g., labeled 125) and available for OCDMA signatures of other data streams. For example, each OCDMA signature is composed of the same number of time chips 110, wavelength slots 115, and occupied elements 120. To achieve privacy, the OCDMA signature for a particular data stream may be selected from a pool of OCDMA signatures according to a predetermined sequence. Other data streams then simply use other OCDMA signatures that do not correspond.

In two-dimensional OCDMA signal 100, each transmitted data bit 105 has the same fixed number of time chips 110 as a previous data bit 105. For example, each data bit 105 (i.e., bits 1, 2, 3, etc.) of two-dimensional OCDMA signal 100 is divided into an array of four time chips 110 and eight wavelength slots 115. In each array, four elements are selected and occupied according to the OCDMA signature. Each successive data bit 105 is represented by a different OCDMA signature selected from a pool of OCDMA signatures according to a predetermined sequence.

In FIG. 2, optical data bit scrambling signal 200 comprises a plurality of wavelength channels 215 such that each individual data stream is scrambled across both time (i.e., illustrated along axis 102) and wavelength (i.e., illustrated along axis 101). Optical data bit scrambling signal 200 is configured as a plurality of data frames 205, with each individual data frame 205 composed of a matrix having the same number of time slices 210 and wavelength channels 215. Time slices 210 have equal time intervals that correspond to data bits 216 of a source data stream (i.e., occupied locations 220 of bits 1, 2, 3, etc.) and to unoccupied locations 225.

In a data frame 205, a specific number of data bits occupy locations 220 in a matrix of time slices 210 and wavelength channels 215. For example, each of occupied locations 220 contains a specific data bit from the source data stream and is represented by a pulse of light. A binary zero is represented by the absence of light in the matrix (i.e., unoccupied locations 225). Matrix locations that are not needed for a particular data stream bit scrambling remain unoccupied 225 and are available for bit scrambling transmissions of other data streams. For each data frame 205, a unique bit scrambling pattern is selected. For an enhancement to privacy, the bit scrambling pattern for a particular data stream may be selected from a pool of bit scrambling patterns according to a predetermined sequence.

In optical data bit scrambling, each data frame 205 has the same fixed number of time slices 210 as the previous data frame 205. For example, each data frame 205 (e.g., data frames A, B, C, etc.) are divided into a matrix of four time slices 210 and four wavelength channels 215. In each data frame 205, four locations are selected according to a bit scrambling pattern. Four data bits in the data stream occupy those selected locations (e.g., bits 1, 2, 3 and 4 occupy frame A). For each successive data frame 205, a different bit scrambling pattern is selected from a pool of bit scrambling patterns according to a predetermined sequence.

Figure 3:
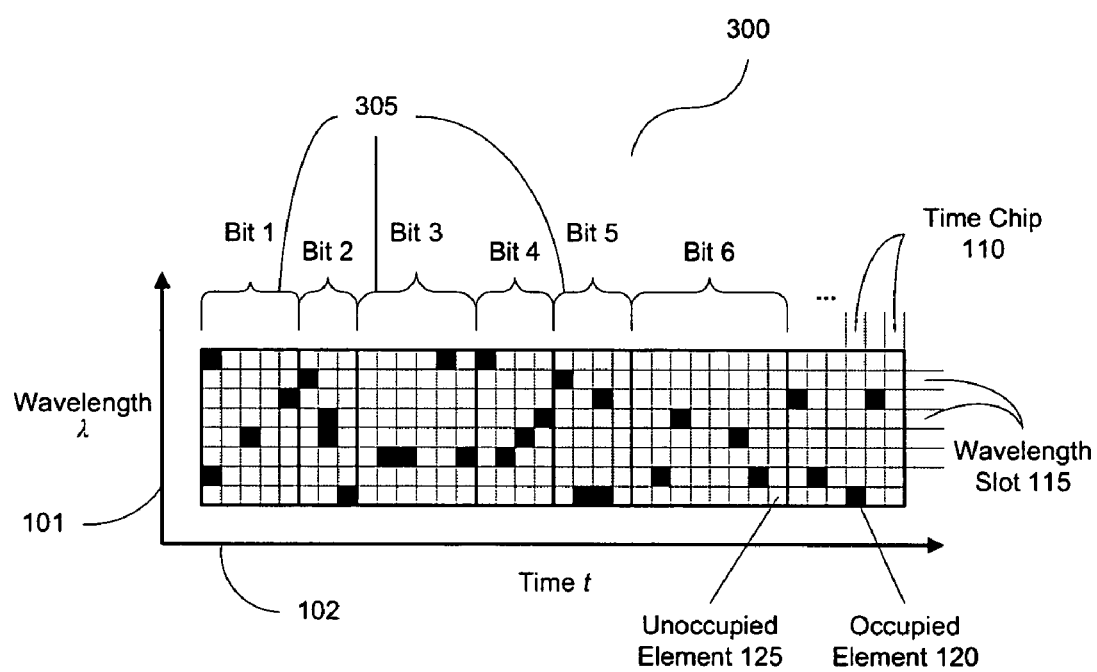
FIG. 3 is a signaling diagram illustrating dynamic temporal duration optical transmission privacy for a two-dimensional OCDMA signal.

FIG. 3 illustrates two-dimensional OCDMA signal 300 utilizing dynamic temporal durations to enhance privacy of optical communications. As with the prior art two-dimensional OCDMA signal 100 of FIG. 1, each data bit 305 is represented by an OCDMA signature. The OCDMA signature is a two-dimensional array comprised of a number of time chips 110 and a number of wavelengths slots 115. However, the OCDMA signature for each successive data bit 305 dynamically varies with respect to the number of time chips 110 that make up each two-dimensional array. For example, adjacent data bits 305 may differ in terms of the number of time chips 110. Note that the period of time for each time chip 110 is constant, while the duration of data bits 305 is dynamic or variable/varying.

The number of time chips 110 in each successive OCDMA signature may be varied according to a predetermined sequence. For example, each successive data bit 305 may be represented by a different OCDMA signature selected from a pool of OCDMA signatures. Each OCDMA signature may have a particular number of time chips that determines the number of time chips 110 in a data bit 305. The number of occupied elements 120 in each successive OCDMA signature may also be varied according to a predetermined sequence, such as a substantially random sequence.

Figure 4:
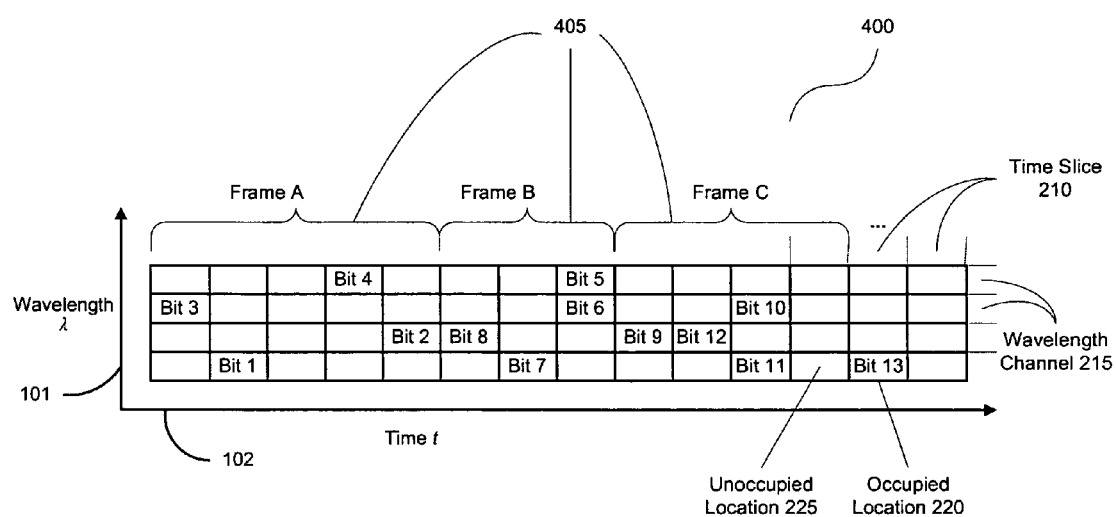
FIG. 4 is a signaling diagram illustrating dynamic temporal duration optical transmission privacy for an optical data bit scrambling signal.

FIG. 4 illustrates optical data bit scrambling signal 400 signal utilizing dynamic temporal durations to enhance privacy of optical communications. As with prior art optical data bit scrambling 200, optical data bit scrambling signal 400 is configured as a plurality of data frames 405, with each individual data frame 405 composed of a matrix of time slices 210 and wavelength channels 215. Differing from optical data bit scrambling signal 400 is that successive data frames 405 are dynamically varied with respect to the number of time slices 210. The period of each time slice 210 is constant, while the overall duration of each data frame 405 is dynamic or variable/varying.

The number of time slices 210 in each successive data frame 405 may be varied according to a predetermined sequence. For example, each successive data frame 405 may be populated by a different scrambling pattern selected from a pool of scrambling patterns. Each scrambling pattern may have a number of time slices that determines the number of time slices 210 in a given data frame 405. The number of occupied locations 220 in each successive scrambling pattern may also be varied according to the predetermined sequence.

Figure 5:
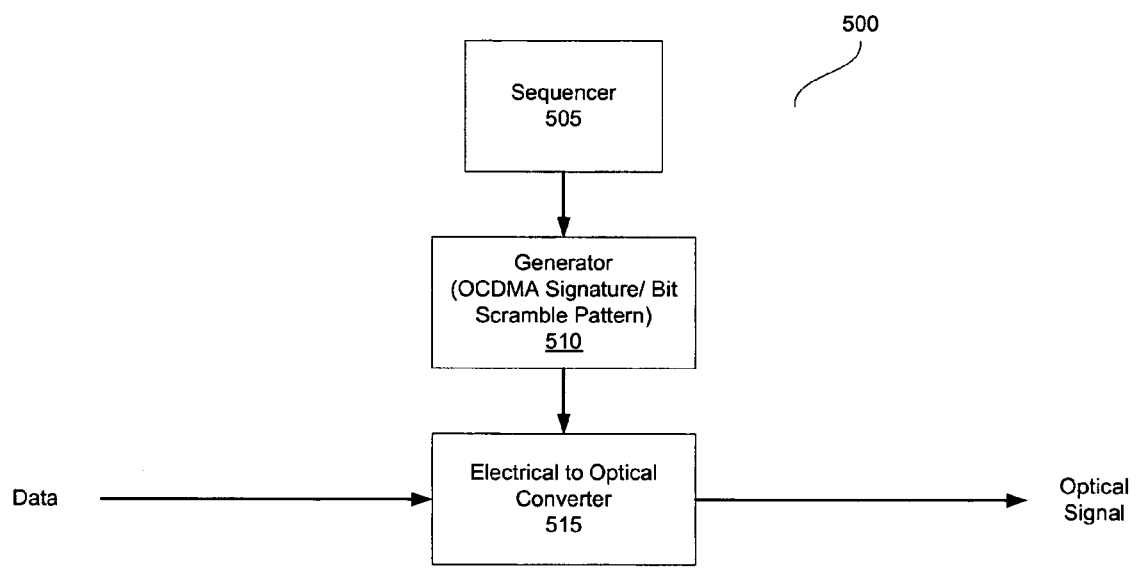
FIG. 5 is a block diagram of an optical transmitter that utilizes dynamic temporal duration.

FIG. 5 is a block diagram of optical transmitter 500 that utilizes dynamic temporal duration to enhance privacy of an optical data transmission. In this embodiment, a sequence of settings may be determined before data is transmitted optically. For example, transmitter 500 may include sequencer 505 which may be configured to establish settings prior to transmission for either two-dimensional OCDMA signal 300 of FIG. 3 or optical data bit scrambling signal 400 of FIG. 4. For two-dimensional OCDMA signal 300, these settings may include determination of an OCDMA signature based at least in part on a number of time chips 110 and/or a number of occupied elements 120. For optical data bit scrambling signal 400, these settings may include a determination of a bit scrambling pattern (e.g., based at least in part on a number of time slices 210 in a data frame 405 and/or a number of occupied locations 220 in a data frame 405).

With the settings established, generator 510 may generate the appropriate code. For example, generator 510 may generate an OCDMA signature having a number of time chips 110 as determined by sequencer 505 to control the number of time chips 110 in a data bit 305 of two-dimensional OCDMA signal 300. Alternatively, generator 510 may generate a scramble pattern having a number of time slices 210 as determined by sequencer 505 to control the number of time slices 210 in a data frame 405 of optical data bit scrambling signal 400. Although discussed in terms of code generation, those skilled in the art should readily recognize that the code may be pregenerated and selected from, for example, a database of codes (e.g., a plurality of OCDMA signatures or a plurality of scrambling patterns).

Electrical to optical converter 515 uses the generated code to convert electronic data to an optical signal. For example, electrical to optical converter 515 may receive the generated code from generator 510 to configure a number of time chips 110 for two-dimensional OCDMA signal 300 on a per data bit 305 basis. Alternatively, electrical to optical converter 515 may use the generated code to configure a number of time slices 210 for optical data bit scrambling signal 400 on a per data frame 405 basis. Once the data bits 305 or data frames 405 are configured, electrical to optical converter 515 may use the generated code to format the data within the data bits 305 or data frames 405, respectively.

Figure 6:
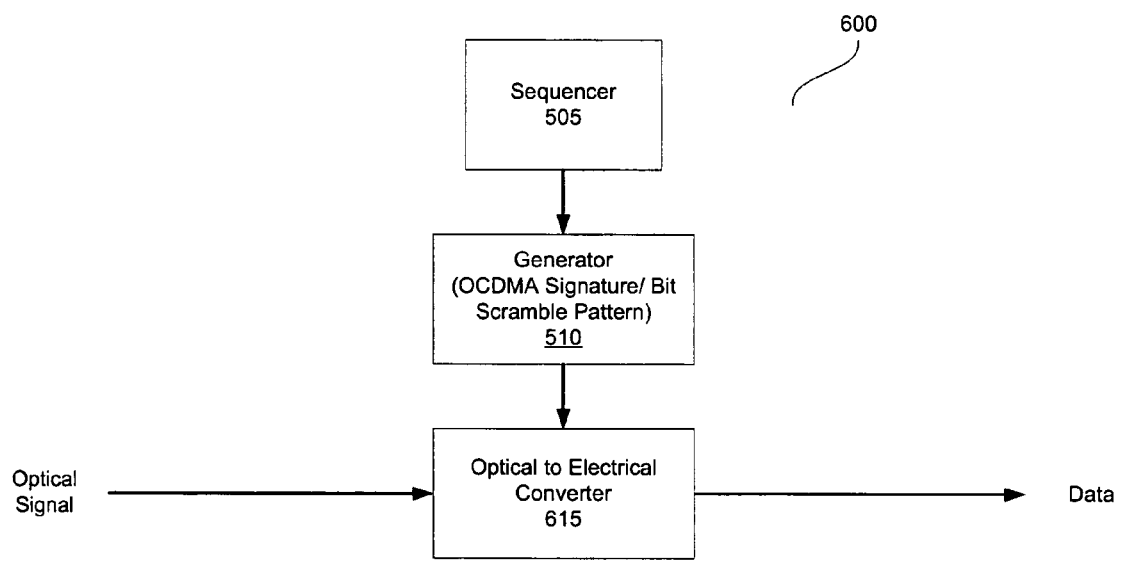
FIG. 6 is a block diagram illustrating a receiver that utilizes dynamic temporal duration.

FIG. 6 is a block diagram of optical receiver 600 that utilizes dynamic temporal duration to enhance privacy. Before data is received optically, a sequence of settings may be determined. This sequence of settings is generally the same as that used by transmitter 500 of FIG. 5. As such, receiver 600 may include certain components that are similar in nature to those of transmitter 500 to reverse the encoding (i.e., alteration of temporal durations) performed by transmitter 500. For example, receiver 600 may include sequencer 505 to establish settings prior to reception of either two-dimensional OCDMA signal 300 of FIG. 3 or optical data bit scrambling signal 400 of FIG. 4. For two-dimensional OCDMA signal 300, these settings may again include determination of an OCDMA signature based at least in part on a number of time chips 110 and/or a number of occupied elements 120. For optical data bit scrambling signal 400, these settings may again include a determination of a bit scrambling pattern (e.g., based at least in part on a number of time slices 210 in a data frame 405 and/or a number of occupied locations 220 in a data frame 405).

With the settings established, generator 510 may generate the appropriate code. For example, generator 510 may generate an OCDMA signature having a number of time chips 110 as determined by sequencer 505 to correctly ascertain the number of time chips 110 in a received data bit 305 of two-dimensional OCDMA signal 300. Alternatively, generator 510 may generate a scramble pattern having a number of time slices 210 as determined by sequencer 505 to ascertain the number of time slices 210 in a received data frame 405 of optical data bit scrambling signal 400. Again, those skilled in the art should readily recognize that such codes may be selected rather than generated.

As receiver 600 is configured for receiving data, receiver 600 may include optical to electrical converter 615. Optical to electrical converter 615 uses a generated code to convert electronic data to an optical signal. For example, optical to electrical converter 615 may receive the generated code from generator 510 to configure a number of time chips 110 for reception of two-dimensional OCDMA signal 300 on a per data bit 305 basis or to configure a number of time slices 210 for reception of optical data bit scrambling signal 400 on a per data frame 405 basis. Once the data bits 305 or data frames 405 are configured, optical to electrical converter 515 may use the generated code to extract the optical information from data bits 305 or data frames 405, respectively, and convert that optical information to an electronic data signal.

Figure 7:
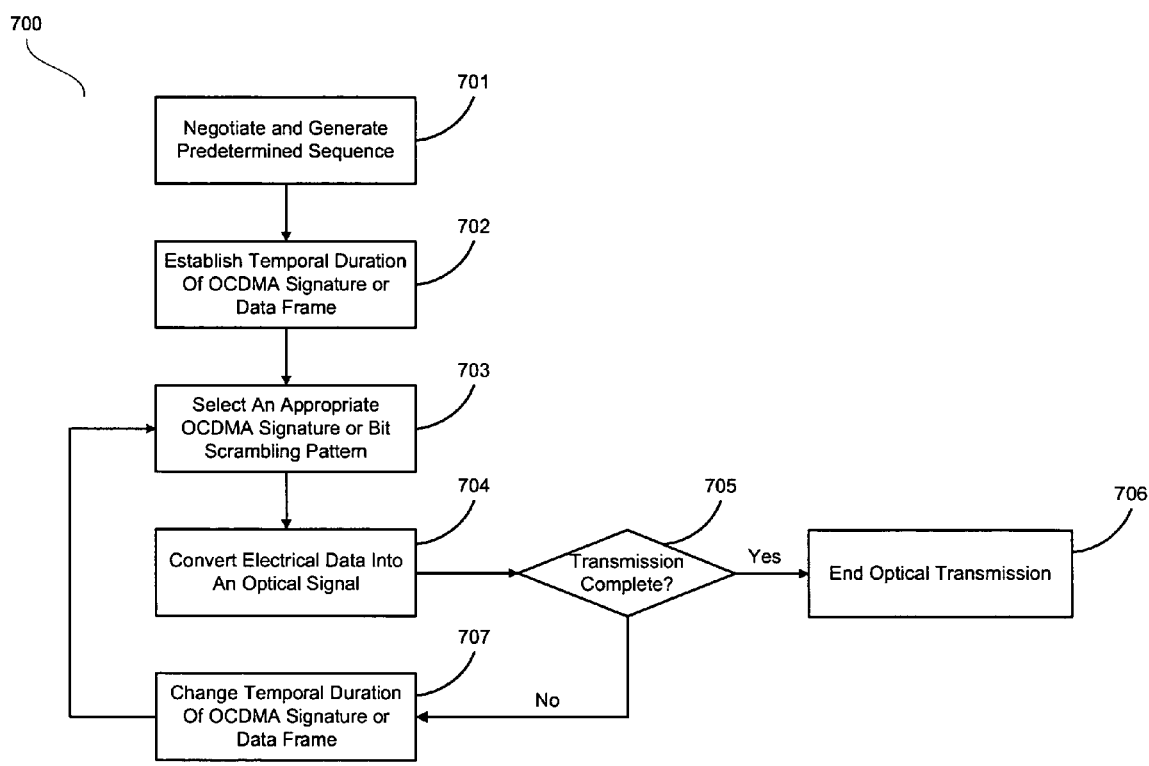
FIG. 7 is a flow chart illustrating a transmission operation that utilizes dynamic temporal duration.

FIG. 7 is flow chart 700 illustrating the optical transmission of an optical signal that utilizes dynamic temporal duration to enhance privacy. A sequence of settings is negotiated between transmitter 500 of FIG. 5 and receiver 600 of FIG. 6, in step 701. It is not necessary for the entire sequence to be transferred between transmitter 500 and receiver 600. Rather, it may only be necessary for the negotiation of the manner in which the sequence is to be generated. Afterwards, transmitter 500 uses the sequence to establish a temporal duration of the OCDMA signature or the data frame, in step 702. Using this temporal duration, the OCDMA signature or bit scramble pattern is selected (e.g., an OCDMA signature for two-dimensional OCDMA signal 300 of FIG. 3 or a scramble pattern for optical data bit scrambling signal 400 of FIG. 4), in step 703. The selected OCDMA signature or selected bit scramble pattern is used to convert the electrical data into an optical signal for transmission, in step 704.

Once the optical signal is generated, a determination may be made regarding whether optical signal transmission is necessary, in step 705. For example, once the last bit of two-dimensional OCDMA signal 300 or the last frame of optical data bit scrambling signal 400 has been transmitted, optical signal transmission may end in step 706. However, if transmission of two-dimensional OCDMA signal 300 or optical data bit scrambling signal 400 is to continue, corresponding temporal durations are subsequently changed in step 707. The process then returns to step 703 for recursion of steps 703, 704, and 707.

Figure 8:
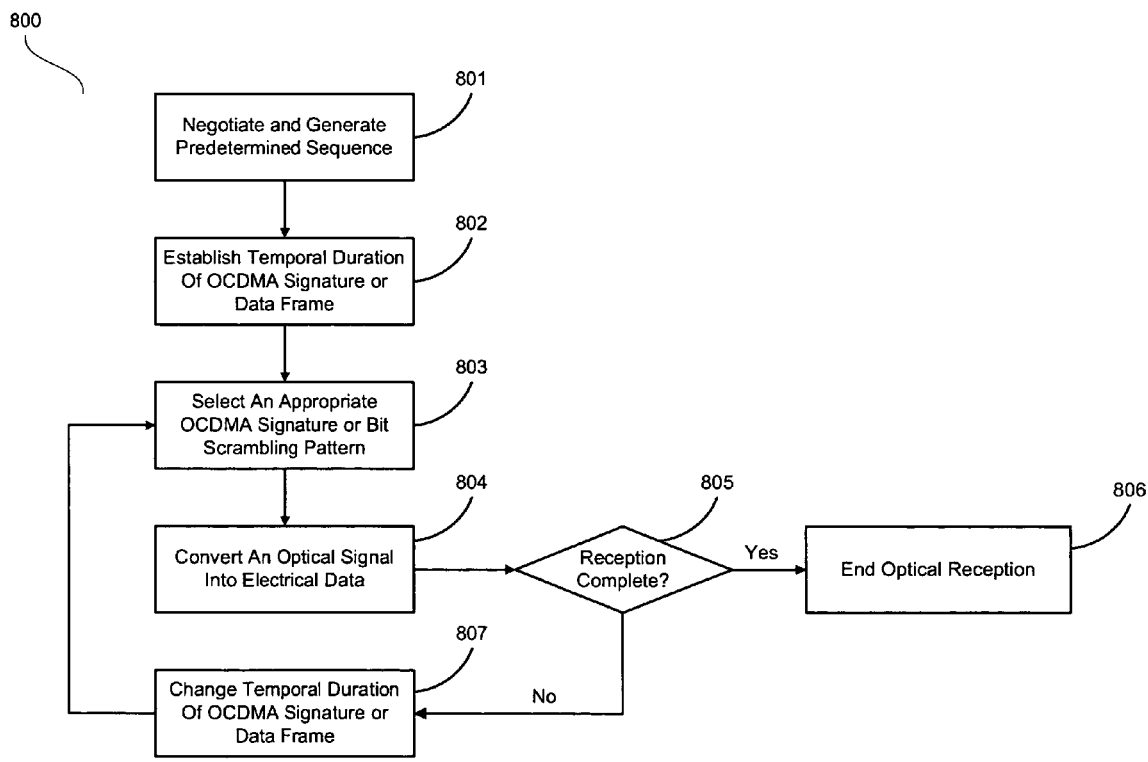
FIG. 8 is a flow chart illustrating a reception operation that utilizes dynamic temporal duration.

FIG. 8 is flow chart 800 illustrating the optical reception of an optical signal that utilizes dynamic temporal duration to enhance privacy. A sequence of settings is negotiated between transmitter 500 of FIG. 5 and receiver 600 of FIG. 6, in step 801. Again, it is not necessary for the entire sequence to be transferred between transmitter 500 and receiver 600. Rather, it may only be necessary for the negotiation of the manner in which the sequence is to be generated. Afterwards, transmitter 500 uses the sequence to establish the temporal duration of the OCDMA signature or data frame, in step 802. Using this temporal duration, the OCDMA signature or bit scramble pattern is selected (e.g., an OCDMA signature for two-dimensional OCDMA signal 300 of FIG. 3 or a scramble pattern for optical data bit scrambling signal 400 of FIG. 4), in step 803. The selected OCDMA signature or selected bit scramble pattern is used to convert the optical signal into electronic data, in step 804.

Once the electronic data is generated, a determination may be made regarding whether optical signal reception is necessary, in step 805. For example, once the last bit of two-dimensional OCDMA signal 300 or the last frame of optical data bit scrambling signal 400 of FIG. 4 has been received, optical signal reception may end in step 806. However, if reception of two-dimensional OCDMA signal 300 or optical data bit scrambling signal 400 is to continue, corresponding temporal durations are subsequently changed in step 807. The process then returns to step 803 for recursion of steps 803, 804, and 807.

While the above embodiments have been shown and described in sufficient detail so as to enable one skilled in the art to make and use the invention, the invention is not intended to be limited to these embodiments. Those skilled in the art should readily recognize that certain features may be implemented in different ways. For example, certain steps may be implemented optically and/or electronically (e.g., such as with optoelectronic components). Additionally, such features may be controlled via firmware and/or software. Those skilled in the art are readily familiar with optoelectronics, software and firmware.

The foregoing description of the present invention has been presented for purposes of illustration and description. Furthermore, the description is not intended to limit the invention to form disclosed herein. Consequently, variations and modifications commensurate with the above teachings, and skill and knowledge of the relevant art, are within the scope of the present invention. The embodiments described hereinabove are further intended to explain best modes known as practicing the invention and to enable others skilled in the art to utilize the invention in such or other embodiments with various modifications required by the particular application(s) or use(s) of the present invention. It is intended that the appended claims, therefore, be construed to include alternative embodiments to the extent permitted by the prior art.

What is claimed is:

1. A method of privatizing an optical data transmission, comprising the steps of:
    selecting an OCDMA signature;
    converting a single data bit into an optical signal based upon said OCDMA signature from said selecting step;
    transmitting said optical signal from said converting step; and
    repeating said selecting, converting, and transmitting steps a plurality of times, wherein a temporal length of said OCDMA signature is of a different magnitude for at least two executions of said converting step, wherein during said repeating said selecting, converting, and transmitting steps a plurality of times, said temporal length of said OCDMA signature is varied in a predetermined sequence.

2. The method of claim 1, further comprising the step of configuring said optical signal with a plurality of optical wavelengths.

3. The method of claim 1, wherein said optical data transmission is a two-dimensional OCDMA signal.

4. The method of claim 1, wherein said selecting step comprises the step of selecting said OCDMA signature from a plurality of OCDMA signatures.

5. The method of claim 1, further comprising the step of electronically retrieving said single data bit from storage.

6. The method of claim 1, wherein said temporal length of said OCDMA signature for an execution of said selecting step is different than said temporal length of said OCDMA signature from an immediately previous-in-time execution of said selecting step.

7. A method of privatizing an optical data transmission, comprising the steps of:
    selecting an OCDMA signature;
    converting a single data bit into an optical signal based upon said OCDMA signature from said selecting step;
    transmitting said optical signal from said converting step; and
    repeating said selecting, converting, and transmitting steps a plurality of times, wherein a temporal length of said OCDMA signature is of a different magnitude for at least two executions of said converting step, wherein said temporal length of said OCDMA signature for each execution of said selecting step is different than said temporal length of said OCDMA signature from an immediately previous-in-time execution of said selecting step.

8. A method of privatizing an optical data transmission, comprising the steps of:
    generating a plurality of unique scramble patterns and a frame temporal length for a data frame;
    assigning a plurality of data bits to a plurality of elements within said data frame based upon said plurality of unique scramble patterns;
    transmitting said data frame after said assigning step; and
    repeating said generating, assigning, and transmitting steps a plurality of times, wherein at least one execution of said generating step uses different said frame temporal length than another execution of said generating step.

9. The method of claim 8, further comprising the step of configuring said optical data transmission with a plurality of optical wavelengths.

10. The method of claim 8, wherein said optical data transmission is an optical data bit scrambling signal.

11. The method of claim 8, wherein each said data frame comprises a plurality of time slices, wherein said step of generating both a scramble pattern and a frame temporal length for a data frame comprises the step of establishing a substantially constant time slice duration for each said data frame.

12. The method of claim 8, wherein each execution of said generating step uses a different said frame temporal length than an immediately previous-in-time execution of said generating step.

13. The method of claim 8, wherein said plurality of elements are in a two-dimensional array of time versus wavelength, wherein each said element is of the same temporal length, and wherein each said generating step comprises changing a number of said elements from an immediately previous-in-time execution of said generating step.

14. The method of claim 8, wherein for each performance of said assigning step, said plurality of data bits constitute an entirety of data bits of said optical data transmission, wherein at least one execution of said generating step uses a different said frame temporal length than an immediately previous-in-time execution of said generating step.

15. A method of privatizing an optical data transmission, comprising the steps of:
    generating both a scramble pattern and a frame temporal length for a data frame;
    assigning at least one data bit to at least one element within said data frame based upon said scramble pattern;
    transmitting said data frame after said assigning step; and
    repeating said generating, assigning, and transmitting steps a plurality of times, wherein at least one execution of said generating step uses a different said scramble pattern and a different said frame temporal length than another execution of said generating step, wherein said data frame comprises a plurality of time chips, wherein each said time chip comprises a plurality of wavelength slots, wherein each said time chip is of a common temporal length, and wherein an execution of said generating step uses a different number of said time chips than an immediately previous-in-time execution of said generating step.

16. A method of privatizing an optical data transmission comprising a plurality of optical data segments, said method comprising the steps of:
    establishing a temporal length of an optical data segment;
    embedding data in said optical data segment after said establishing step;
    transmitting said optical data segment after said embedding step; and
    repeating said establishing, embedding, and transmitting steps a plurality of times, wherein said repeating step comprises privatizing said optical data transmission by varying a magnitude of said temporal length of at least two said optical data segments in said optical data transmission, wherein said temporal length of said optical data segment for an execution of said embedding step is different than said temporal length of said optical data segment from an immediately previous-in-time execution of said embedding step.

17. The method of claim 16, wherein each said optical data segment in said optical data transmission has a different said temporal length than each adjacent said optical data segment in said optical data transmission.

18. The method of claim 16, wherein each execution of said embedding step comprises embedding a single data bit in said optical data segment.

19. The method of claim 16, wherein each execution of said embedding step comprises embedding multiple data bits in said optical data segment.

20. The method of claim 16, wherein each execution of said embedding step embeds a common number of data bits in said optical data segment.

21. The method of claim 16, wherein said optical data segment comprises a plurality of elements in a two-dimensional array of time versus wavelength, wherein each said element is of the same said temporal length.

22. The method of claim 21, further comprising the step of varying a dispersion pattern of said data within said plurality of elements of said optical data segment for at least two executions of said embedding step.

23. The method of claim 21, wherein a number of said elements in said optical data segment for each execution of said embedding step is different than a number of said elements in said optical data segment from an immediately previous-in-time execution of said embedding step, and wherein a dispersion pattern of said data within said plurality of elements of said optical data segment for each execution of said embedding step is different than a dispersion pattern of said data within said plurality of elements of said optical data segment from an immediately previous-in-time execution of said embedding step.

24. The method of claim 16, wherein said establishing step comprises the step of selecting an OCDMA signature from a plurality of OCDMA signatures.

25. The method of claim 16, further comprising the step of controlling said establishing step with an algorithm and controlling said embedding step with an algorithm.

26. A method of privatizing an optical data transmission comprising a plurality of optical data segments, said method comprising the steps of:
  establishing a temporal length of an optical data segment;
  embedding data in said optical data segment after said establishing step;
  transmitting said optical data segment after said embedding step; and
  repeating said establishing, embedding, and transmitting steps a plurality of times, wherein said temporal length of at least two said optical data segments in said optical data transmission are of different magnitudes, wherein said optical data segment comprises a plurality of time chips, wherein each said time chip comprises a plurality of wavelength slots, wherein each said time chip is of a common temporal length, and wherein said optical data segment for an execution of said embedding step uses a different number of said time chips than said optical data segment from an immediately previous-in-time execution of said embedding step.

* * * * *

UNITED STATES PATENT AND TRADEMARK OFFICE
CERTIFICATE OF CORRECTION

Page 1 of 1

| | |
|---|---|
| PATENT NO. | : 7,903,973 B1 |
| APPLICATION NO. | : 11/317135 |
| DATED | : March 8, 2011 |
| INVENTOR(S) | : Howard J. Schantz and Brian L. Uhlhorn |

It is certified that error appears in the above-identified patent and that said Letters Patent is hereby corrected as shown below:

Col. 9, Line 63 Claim 8, after "uses", insert --a--.

Signed and Sealed this
Twenty-sixth Day of April, 2011

David J. Kappos
*Director of the United States Patent and Trademark Office*